2,789,118
Patented Apr. 16, 1957

2,789,118
16-ALPHA OXY-Δ$^{1,4}$-PREGNADIENES

Seymour Bernstein, Pearl River, N. Y., Robert H. Lenhard, Ridgefield Park, N. J., and William S. Allen, Pearl River, N. Y., assignors to American Cyanamid Company, New York, N. Y., a corporation of Maine No Drawing. Application March 30, 1956
Serial No. 574,981

6 Claims. (Cl. 260—397.45)

This invention relates to new Δ$^{1,4}$-steroids. More particularly, it relates to steroids containing the Δ$^{1,4}$-moiety in the pregnadiene series.

Recently, a number of steroids of the pregnene and pregnadiene series, such as hydrocortisone and 1-dehydrohydrocortisone, have become important therapeutic agents and useful as intermediates for the preparation of other therapeutically useful steroids. The compounds of the present invention are useful as anti-inflammatory agents in the treatment of arthritis, asthma, burns, bursitis, and the like, and also in the treatment of skin disorders and collagen diseases. The compounds are used in combination with fillers, excipients, etc., in tablets, powders, pills, etc. They can also be used parenterally in a solution or in a suspension.

The compounds of the present invention can be illustrated by the following structural formula:

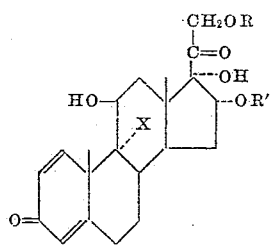

in which X is hydrogen or halogen, and R and R' are hydrogen or a lower alkanoyl radical.

The compounds of the present invention are crystalline solids, having a definite melting point. They are, in general, soluble in the usual organic solvents.

The present compounds are prepared by microbiological fermentation under proper conditions, using *Corynebacterium simplex* ATCC 6946 (Lederle No. 45). The *Corynebacterium simplex* is cultivated aerobically in a suitable nutrient medium with a Δ$^4$-steroid of the pregnene series, as described hereinafter. During the growth of the organism under favorable conditions, two hydrogen groups are eliminated from the steroid ring A, and a double bond is thereby obtained in the 1-2-position. The exact mechanism of this dehydrogenation is obscure, but it is the result of enzymes produced by the organism in the process of growth. A suitable nutrient medium contains a soluble source of carbon, nitrogen, and mineral elements. Sources of carbon include sugars, such as glucose, sucrose, maltose, dextrose, etc. Also, alcohols, such as glycerol or mannitol; organic acids, such as citric acid, malic acid, and acetic acid; and various natural products containing carbohydrates, such as corn starch, corn steep liquor, soybean meal, cotton seed meal, and many other available materials which have been used heretofore as sources of carbon in fermentation processes. Usually, a variety of the above can be employed in the medium with good results.

Suitable sources of nitrogen include some of the above-named materials, such as corn steep liquor, soybean meal, cotton seed meal, and the like, and various other substances, such as beef extract, casein, yeast, enzymatically digested proteins, and degradation products, including peptones, amino acids, and many other available proteinaceous materials which have been found to be suitable in supporting the growth of *Corynebacterium simplex*. Inorganic sources of nitrogen include urea, ammonium salts, nitrates, and the like. These may be used in the medium as a source of assimilable nitrogen to provide a favorable growth medium for the organism.

The mineral requirements of the fermentation are usually supplied in the crude materials which are often used as sources of carbon and nitrogen or occur in water that is used in the process. However, it is usually advisable to supplement the minerals normally present with added amounts to obtain a maximum growth of the *Corynebacterium simplex*. Cations and anions, which may be desirable in added amounts, include sodium, potassium, calcium, magnesium, phosphate, sulfate, chloride, cobalt, manganese, and various others. The use of trace elements, such as boron, copper, cobalt, molybdenum, and chromium, is often desirable.

The growth of the *Corynebacterium simplex* takes place under aerobic conditions, and aeration in flasks, for examples, can be achieved by agitation on a reciprocating or rotary shaker or in bottles or tanks by forcing sterile air through the fermentation mixture. It is desirable that the sterile air be forced through the medium in an amount of from ⅓ to 2 volumes of air per volume of medium per minutes. Agitation in the bottles or fermenter tanks is provided by a mechanical impeller. While *Corynebacterium simplex* will grow at temperatures between 10 and 45° C., it is preferable to carry out the process of the present invention at a temperature of from 25° to 38° C.

To prepare inocula, 1.0 ml. of washed vegetative cell suspension of *Corynebacterium simplex* is used to inoculate 100 ml. of sterile Trypticase soy broth in 500 ml. Erlenmeyer flasks. The Trypticase soy broth is made up of 3% Trypticase digest of soy proteins (Baltimore Bacteriological Laboratories), glycerine—5%, and beef extract (Armour)—0.3%. After sterilization for 15 minutes at a temperature of 120° C. (15 lb. steam pressure), a medium having a pH within the range of 7.4–7.7 is obtained. The inoculated flask is incubated at 37° C. on a shaker for about 4–8 hours. Such inocula may be used to inoculate larger batches of sterile medium in bottles and such bottle cultures, after fermentation, may be used to inoculate larger batches of medium in fermenter tanks. In place of the Trypticase soy broth used above, other media can be used.

The Δ$^4$-steroids of the pregnene series which can be used in the process of the present invention are illustratable by the following general formula:

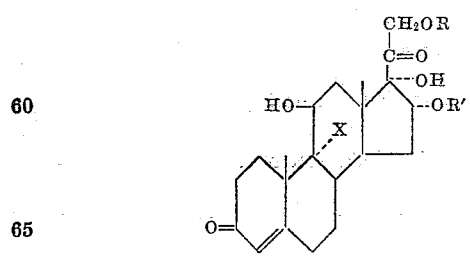

in which X is hydrogen or halogen, and R and R' are hydrogen or an alkanoyl radical. The above steroids are generally added to the fermentation in solution or in finely-divided form. A preferred method is to dissolve the steroid in ethanol or other water-miscible solvents and add it to the fermentation medium at the desired stage in the process. Although the $\Delta^4$-steroid may precipitate from solution when so added, it is dispersed throughout the medium as a fine suspension and becomes readily available to the organism for oxidation. The amount of steroid added to the fermentation may vary considerably, but it is generally on the order of 0.1–1 gm. per liter of medium.

During the process of fermentation, it may be desirable to add anti-foaming agents, such as silicones, glyceride oils, and the like. These compounds are added from time to time and in the amounts needed to control foaming.

In the process of the present invention, the 10 ml. batches of inocula of medium in 100 ml. shaker tubes are usually incubated for a period of about 16–48 hours at a temperature of about 32° C. At this point, 2 mgm. of sterile substrate ($\Delta^4$-steroid of the pregnene series), herein described, dissolved in 0.2 ml. of ethanol is added to each tube, and the fermentation is continued at about 32° C. The fermentation is allowed to proceed for a period of time long enough to achieve maximum conversion of the $\Delta^4$-pregnene to the $\Delta^{1,4}$-pregnadiene. This period of time may vary from 2½ hours to 72 hours or longer.

At the conclusion of the fermentation process, the desired $\Delta^{1,4}$-steroid of the pregnadiene series is recovered from the fermentation medium by the following procedure, which describes in particular a 10 ml. fermentation. This is a general procedure and is operative for fermentations of various sizes.

The contents of a fermentation tube are extracted four times with four volumes of methylene chloride. The four extracts are pooled, and the resulting solution is then washed once with 2% sodium bicarbonate saturated with sodium chloride and then washed twice with saturated sodium chloride. The washed methylene chloride solution can be dried over anhydrous magnesium sulfate and filtered. The filtrate is concentrated on the steam bath at atmospheric pressure to a small volume, and the concentrate is transferred to a 10 ml. volumetric flask and brought up to volume with methylene chloride. This solution is used for characterization of the steroid content, as described hereinafter.

In large-scale fermentations, the crude product or products may be recovered from the fermentation beer by simple solvent extraction, using a suitable water-immiscible solvent, such as chlorinated lower hydrocarbons, alcohols, esters, etc. Further purification and separation of steroid products from extracts may be accomplished by methods well understood by those skilled in the art. Separation and purification of steroid mixtures often requires the use of chromatography.

The process employed to identify the steroids present in the extracted fermentation beer previously described is by paper strip chromatography. The solvent system used is water-methanol-benzene, prepared by shaking approximately 50% water and 50% methanol with benzene in a separatory funnel and then allowing the two layers to separate. A portion of the lower layer is placed in an open dish on the floor of a large glass cylinder. The upper layer is the solvent phase and is used to fill the trough-shaped well within the cylinder. A standard steroid solution is prepared by dissolving 10 mgm. of each of the following steroids in 10 ml. of methylene chloride:

$\Delta^4$-pregnene-11$\beta$,16$\alpha$,17$\alpha$,21-tetrol-3,20-dione $\Delta^4$-pregnene-11$\beta$,16$\alpha$,17$\alpha$,21-tetrol-3,20-dione 16,21-diacetate $\Delta^4$-pregnene-9$\alpha$-fluoro-11$\beta$,16$\alpha$,17$\alpha$,21-tetrol-3,20-dione $\Delta^4$-pregnene-9$\alpha$-fluoro-11$\beta$,16$\alpha$,17$\alpha$,21-tetrol-3,20-dione 16,21-diacetate (Other steroids can be used in the standard solution when appropriate.)

At least one standard solution is chromatographed simultaneously each time an unknown solution is tested. Exactly 0.025 ml. of the standard steroid test solution is applied to the paper strip at the starting line, four inches from the upper end of the strip, which is folded over the edge of the trough and immersed in the solvent phase within. The strip is then developed for 2–4 hours at 37° C. Similarly, 0.1 ml. of the unknown solution is applied to another strip, which is then folded into the same trough and developed simultaneously with the steroid "standard" strip. The trough permits development of many strips simultaneously. After proper development of the paper strips, they are removed from the apparatus and dried with air at about 37° C. After drying, the strips are sprayed with an alkaline solution of Blue Tetrazolium, which develops color at the spots at which the steroids are present. Color-developed strips are lined up with at least one standard strip and compared. The different steroids can be identified by their positions on the strips.

The desired $\Delta^{1,4}$-steroids will be more polar than their corresponding $\Delta^4$-steroid. It should be understood, moreover, that the desired $\Delta^{1,4}$-steroids, once they have been isolated and characterized, may themselves be used in a standard steroid solution for process improvement.

The specific examples which follow illustrate the dehydrogenation of $\Delta^4$-steroids of the pregnene series to produce the corresponding $\Delta^{1,4}$-steroids of the pregnadiene series.

EXAMPLE 1

*Preparation of $\Delta^{1,4}$-pregnadiene-11$\beta$,16$\alpha$,17$\alpha$,21-tetrol-3,20-dione*

A Trypticase soy agar test tube slant was washed with 5 ml. of sterile water, and the resulting cell suspension of *Corynebacterium simplex* was used to inoculate 100 ml. of sterile Trypticase soy broth medium in a 500 ml. Erlenmeyer flask. This mixture was incubated with shaking at 37° C. for 8 hours. Twenty-five 500 ml. Erlenmeyer flasks, each containing 100 ml. of sterile Trypticase soy broth medium without glycerol, were each inoculated with 1 ml. of the 8 hour old inoculum. These flasks were incubated at 32° C. for 40 hours. At this time, 40 mg. of $\Delta^4$-pregnene-11$\beta$,16$\alpha$,17$\alpha$,21-tetrol-3,20-dione dissolved in 4 ml. of ethanol was added to each flask, and the fermentation was continued for 8 hours at 32° C. The contents of all 25 flasks were pooled, giving a mash of pH 8.1.

The pooled beer after harvest was extracted once with 3 liters of methylene chloride and three times with 2-liter portions of methylene chloride. The combined extract was washed once with saturated saline and evaporated to dryness under reduced pressure. This gave 509 mg. of oily residue, which was dissolved in 1.5 ml. of the stationary phase from the system, 3 parts ethyl acetate: 2 parts petroleum ether (90–100° C.): 3 parts methanol: 2 parts water, and mixed with 3 g. of diatomaceous earth. This impregnated diatomaceous earth was then packed on top of a 1.5 x 35 cm. glass column containing 25 g. of diatomaceous earth impregnated with 12.5 ml. of the stationary phase from the above system. The desired compound was then eluted with the mobile phase from the above system, giving 207 mg. of crude solid. This was crystallized from acetone-petroleum ether (60–70° C.) to give 56 mg., melting point 195°–200° C. (Köfler block). Recrystallization from the same solvent pair raised the melting point to 202°–205° C. (block); melting point, 229°–231° C. (capillary method).

Ultraviolet spectrum: $\lambda_{Max.}^{EtOH}$ 241 m$\mu$ ($\epsilon$ 14,500). Infrared spectrum: $\nu_{Max.}^{KBr}$ 3412, 1718, 1667, 1622, 1612 (shoulder), 1098, 1072 cm.$^{-1}$.

*Analysis*—Calc'd for $C_{21}H_{28}O$ (376.44): C, 67.00; H, 7.50. Found: C, 66.80; H, 7.62.

The physical and chemical properties of the compound were those for $\Delta^{1,4}$-pregnadiene-11$\beta$,16$\alpha$,17$\alpha$,21-tetrol-3,20-dione.

EXAMPLE 2

*Preparation of $\Delta^{1,4}$-pregnadiene-11β,16α,17α,21-tetrol-3,20-dione*

The pooled beer from a fermentation as described in Example 1 (above) after harvest was extracted with seven 2-liter portions of methylene chloride, and the combined extracts evaporated to dryness under reduced pressure. This gave 1.585 g. of a crude semi-solid, which was chromatographed. The fractions containing the desired compound were combined and evaporated to dryness to give 601 mg. of crystalline residue. Crystallization from acetone-petroleum ether gave 278 mg., melting point 229°–231° C. Recrystallization from the same solvent pair raised the melting point to 231°–232° C. $[\alpha]_D^{24} + 77°$ C. (methanol).

Ultraviolet spectrum: $\lambda_{Max.}^{EtOH}$ 241–242 mμ (ε 14,800). Infrared spectrum: $\nu_{Max.}^{KBr}$ 3436, 1715, 1664, 1621, 1603, 1129, 1063 cm.$^{-1}$.

*Analysis.*—Calc'd for $C_{21}H_{28}O_6$ (376.44); C, 67.00; H, 7.50. Found: C, 66.82; H, 7.27.

The product was identical with a sample of $\Delta^{1,4}$-pregnadiene - 11β, - 16α,17α,21 - tetrol - 3,20 - dione obtained as in Example 1.

EXAMPLE 3

*$\Delta^{1,4}$ - pregnadiene - 11β,16α,17α,21 - tetrol - 3,20 - dione 16,21-diacetate*

A mixture of 100 mg. $\Delta^{1,4}$-pregnadiene-11β,16α,17α,-21-tetrol-3,20-dione in 10 ml. of pyridine containing 2 ml. of acetic anhydride was allowed to stand overnight at room temperature, after which the solution was evaporated to dryness under reduced pressure. The solid residue was crystallized from ethyl acetate-petroleum ether (90°–100° C.), giving 105 mg. (86%) of $\Delta^{1,4}$-pregnadiene - 11β,16α,17α,21 - tetrol-3,20-dione 16,21-diacetate, melting point 147°–150° C. Recrystallization from the same solvent pair raised the melting point to 161°–163° C.

Infrared spectrum: $\nu_{Max.}^{KBr}$ 3458, 1758, 1668, 1632, 1612 (shoulder), 1234, 1060 cm.$^{-1}$. Ultraviolet spectrum: $\lambda_{Max.}^{EtOH}$ 242 mμ (ε 14,200).

EXAMPLE 4

*Preparation of $\Delta^{1,4}$-pregnadiene-9α-fluoro-11β,16α,17α,21-tetrol 16,21-diacetate*

A test tube agar slant of the culture was washed with 5 ml. of sterile saline solution, and the resulting spore suspension of *Corynebacterium simplex* was added to 100 ml. of sterile Trypticase soy broth medium in a 500 ml. Erlenmeyer flask. The mixture was incubated at 32° C. for 8 hours. One ml. of this culture was used to inoculate each of 10 flasks, each flask containing 100 ml. of sterile Trypticase soy broth medium. The 10 flasks were incubated with shaking at 32° C. for 16 hours. Twenty mg. of $\Delta^4$-pregnene-9α-fluoro-11β,16α,17α,21-tetrol-3,20-dione 16,21-diacetate dissolved in 2 ml. of ethanol was added to each flask, and the flasks were pooled. The pooled solution was extracted several times with a large volume of methylene chloride, washed with saturated saline, and evaporated under reduced pressure. The residue was dissolved in methanol, treated with activated charcoal, filtered through diatomaceous earth, and re-evaporated to afford 277 mg. of oil and acetylated overnight. Paper strip chromatography showed approximately equal amounts of substrate and a more polar product ($\Delta^{1,4}$ - pregnadiene - 9α - fluoro - 11β,16α,17α,21 - tetrol-3,20-dione 16,21-diacetate) together with very small amounts of two less polar products. Partition chromatography of 0.25 g. of the residue (diatomaceous earth column; system: 2 parts ethyl acetate, 3 parts petroleum ether (90°–100° C.), 3 parts methanol, and 2 parts water) separated the less polar products and the substrate. The desired most polar product remained on the column and was eluted with 500 ml. of methanol. The residue (90 mg.) from the evaporated methanol was repartitioned on diatomaceous earth (system: 3 parts ethyl acetate, 2 parts petroleum ether (90°–100° C.), 3 parts methanol, and 2 parts water), and the cut containing the desired product (determined by ultraviolet absorption spectrum) was evaporated under reduced pressure to afford 18 mg. of solid. Crystallization from acetone-petroleum ether gave 13 mg. of colorless needles of $\Delta^{1,4}$-pregnadiene-9α-fluoro-11β,16α,17α,21-tetrol-3,20-dione; 16,21 - diacetate; melting point (Köfler block) ca. 150°–240° C. with apparent loss of solvent at 150° C. Recrystallization from acetone-petroleum ether did not alter the melting point.

Ultraviolet spectrum: $\lambda_{max.}^{abs. alc.}$ 239 mμ (15,200), spectrum in sulfuric acid: $\lambda_{max.}^{H_2SO_4}$ 261, 308, 387 mμ.

The 2,4-bis-dinitrophenylhydroazone of the above compound was prepared and its ultraviolet absorption spectrum determined:

$\lambda_{max.}^{CHCl_3}$ 258, 300 (inflection), 312 (infl.) and 400 mμ.

EXAMPLE 5

*$\Delta^{1,4}$-pregnadiene-9α-fluoro-11β,16α,17α,21-tetrol-3,20-dione*

A solution of 100 mg. of $\Delta^{1,4}$-pregnadiene-9α-fluoro-11β,16α,17α,21-tetrol-3,20-dione 16,21-diacetate was dissolved in 10 ml. of methanol and cooled to 0° C. After flushing with nitrogen, a solution of 35 mg. of potassium hydroxide in 2 ml. of methanol was added to the steroid solution. After standing at room temperature for 1 hour, the solution was neutralized the glacial acetic acid and evaporated under a nitrogen atmosphere to a white solid. Water was added, and after cooling, the product was filtered and washed with water to afford 52 mg. of $\Delta^{1,4}$-pregnadiene - 9α - fluoro - 11β,16α,17α,21 - tetrol - 3,20-dione, melting point 246°–249° C. Three crystallizations from acetone-petroleum ether gave 29 mg. of the tetrol, melting point 260°–262.5° C.

*Analysis.*—Calc'd. for $C_{21}H_{27}O_6F$: C, 63.94; H, 6.90; F, 4.82. Found: C, 64.19; H, 7.17; F, 4.90.

We claim:

1. Compounds having the general formula

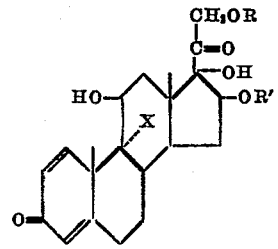

in which X is a member of the group consisting of hydrogen and halogen, and R and R' are members of the group consisting of hydrogen and a lower alkanoyl radical.

2. Compounds in accordance with claim 1 in which R and R' are lower alkanoyl radicals.

3. $\Delta^{1,4}$-pregnadiene-11β,16α,17α,21-tetrol-3,20-dione.

4. $\Delta^{1,4}$ - pregnadiene - 9α - fluoro - 11β,16α,17α,21 - tetrol-3,20-dione.

5. $\Delta^{1,4}$ - pregnadiene - 11β,16α,17α,21 - tetrol - 3,20 - dione 16,21-diacetate.

6. $\Delta^{1,4}$ - pregnadiene - 9α - fluoro - 11β,16α,17α,21 - tetrol-3,20-dione 16,21-diacetate.

References Cited in the file of this patent

UNITED STATES PATENTS

| | | |
|---|---|---|
| 2,705,237 | Djerassi | Mar. 29, 1955 |
| 2,735,855 | Djerassi | Feb. 21, 1956 |
| 2,736,734 | Sarett | Feb. 28, 1956 |
| 2,767,155 | Oliveto | Oct. 16, 1956 |
| 2,767,199 | Djerassi | Oct. 16, 1956 |